United States Patent
Attwell (10) Patent No.: US 10,331,735 B2
(45) Date of Patent: Jun. 25, 2019

(54) METHOD AND SYSTEM FOR CONTROLLING A SCHEDULING ORDER PER CATEGORY IN A MUSIC SCHEDULING SYSTEM

(71) Applicant: iHeartMedia Management Services, Inc., San Antonio, TX (US)

(72) Inventor: Nigel Attwell, Goldens Bridge, NY (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 421 days.

(21) Appl. No.: 14/853,225

(22) Filed: Sep. 14, 2015

(65) Prior Publication Data

US 2016/0004771 A1    Jan. 7, 2016

Related U.S. Application Data

(63) Continuation of application No. 13/850,912, filed on Mar. 26, 2013, now Pat. No. 9,135,061, which is a continuation of application No. 12/856,952, filed on Aug. 16, 2010, now Pat. No. 8,418,182.

(51) Int. Cl.
| | |
|---|---|
| G06F 9/46 | (2006.01) |
| G06F 16/638 | (2019.01) |
| H04H 60/06 | (2008.01) |
| G06F 9/48 | (2006.01) |
| H04H 60/47 | (2008.01) |

(52) U.S. Cl.
CPC .......... *G06F 16/639* (2019.01); *G06F 9/4881* (2013.01); *G06F 9/4887* (2013.01); *H04H 60/06* (2013.01); *H04H 60/47* (2013.01)

(58) Field of Classification Search
CPC ............ G06F 17/30772; G06F 9/4887; G06F 9/4881; H04H 60/06; H04H 60/47
See application file for complete search history.

(56) References Cited

U.S. PATENT DOCUMENTS

| | | | | |
|---|---|---|---|---|
| 5,040,123 A | * | 8/1991 | Barber | ............ G05B 19/41865 |
| | | | | 700/100 |
| 5,233,533 A | * | 8/1993 | Edstrom | ................ G06Q 10/06 |
| | | | | 700/103 |
| 5,890,134 A | * | 3/1999 | Fox | ........................ G06Q 10/06 |
| | | | | 700/100 |

(Continued)

*Primary Examiner* — Adam Lee
(74) *Attorney, Agent, or Firm* — Garlick & Markison; Edward J. Marshall (57) ABSTRACT

A system and method for controlling a scheduling order per category is disclosed. A scheduling order can be designated for the delivery and playback of multimedia content (e.g., music, news, other audio, advertising, etc.) with respect to particular slots within the scheduling order. The scheduling order can be configured to include a forward order per category or a reverse order per category with respect to the playback of the multimedia content in order to control the scheduling order for the eventual airplay of the multimedia content over a radio station or network of associated radio stations. A reverse scheduling technique provides an ideal rotation of songs when a pre-programmed show interferes with a normal rotation. Any rotational compromises can be buried in off-peak audience listening hours of the programming day using the disclosed reverse scheduling technique.

20 Claims, 6 Drawing Sheets

(56) References Cited

U.S. PATENT DOCUMENTS

| | | | |
|---|---|---|---|
| 6,968,364 B1 | 11/2005 | Wong et al. | |
| 7,151,973 B1* | 12/2006 | Moll | G05B 19/41865 |
| | | | 700/100 |
| 7,412,532 B2 | 8/2008 | Gondhalekar et al. | |
| 7,610,011 B2 | 10/2009 | Albrett | |
| 8,413,187 B1* | 4/2013 | Del Sesto | H04N 5/44543 |
| | | | 725/37 |
| 8,418,182 B2 | 4/2013 | Attwell | |
| 2002/0023274 A1 | 2/2002 | Giacalone | |
| 2002/0138630 A1 | 9/2002 | Solomon et al. | |
| 2002/0161890 A1 | 10/2002 | Chen | |
| 2003/0105809 A1 | 6/2003 | Yoshii et al. | |
| 2003/0135536 A1 | 7/2003 | Lyons | |
| 2004/0117046 A1* | 6/2004 | Colle | G06Q 10/06 |
| | | | 700/99 |
| 2005/0022245 A1 | 1/2005 | Nallur et al. | |
| 2005/0154625 A1* | 7/2005 | Chua | G06Q 10/06 |
| | | | 700/100 |
| 2006/0026052 A1* | 2/2006 | Klett | G06Q 10/06 |
| | | | 705/7.12 |
| 2006/0218602 A1 | 9/2006 | Sherer et al. | |
| 2007/0118590 A1 | 5/2007 | Giacalone | |
| 2007/0269181 A1* | 11/2007 | Kikuchi | G11B 27/005 |
| | | | 386/346 |
| 2008/0155616 A1 | 6/2008 | Logan et al. | |
| 2008/0229317 A1 | 9/2008 | Hodson | |
| 2009/0097819 A1 | 4/2009 | Dui et al. | |
| 2009/0129402 A1 | 5/2009 | Moller et al. | |
| 2009/0175591 A1 | 7/2009 | Gondhalekar et al. | |
| 2009/0190898 A1 | 7/2009 | Saito | |
| 2009/0198358 A1 | 8/2009 | Logan et al. | |
| 2010/0070996 A1* | 3/2010 | Liao | G06Q 30/02 |
| | | | 725/35 |
| 2010/0082376 A1 | 4/2010 | Levitt | |
| 2010/0268361 A1 | 10/2010 | Mantel et al. | |
| 2011/0154382 A1 | 6/2011 | Chow et al. | |
| 2012/0042316 A1 | 2/2012 | Attwell | |
| 2012/0089730 A1 | 4/2012 | Bodi et al. | |

\* cited by examiner

402 → Category Group Options

| Pass Order | Group | Reverse Schedule | Slot... | Timing | Stacking | Depth % | Research |
|---|---|---|---|---|---|---|---|
| 1 | A | | ☑ | ☐ | Hour | | 30 |
| 2 | B | ☑ | ☐ | ☐ | | 1 | 999 |
| 3 | <Theme> | ☑ | ☐ | ☐ | | | |
| 4 | <Twofer> | ☑ | ☐ | ☐ | | | |

Station | Dayparts | Packets | House Restrictions | Assignment | Regions | No Repeat | Research | Artist Image | Browse Formats | Hold Categories

503 →

Definition

| Assigned | Name | Reverse Schedule | Group | Region |
|---|---|---|---|---|
| | AM Drive | ☑ | 1 | Normal |
| | Mid-day | ☐ | 1 | Normal |
| | PM Drive | ☐ | 1 | Normal |
| | Night | ☐ | 1 | Normal |
| | Overnight | | | |

FIG. 6A

| 12M | 1A | 2A | 3A | 4A | 5A | 6A | 7A | 8A | 9A | 10A | 11A | 12N | 1P | 2P | 3P | 4P | 5P | 6P | 7P |
|---|---|---|---|---|---|---|---|---|---|---|---|---|---|---|---|---|---|---|---|
| 123 | 451 | 234 | 512 | 345 | 123 | 451 | 234 | 512 | 345 | 123 | 451 | 234 | 512 | 345 | 123 | 451 | 234 | 512 | |

FIG. 6B

| 12M | 1A | 2A | 3A | 4A | 5A | 6A | 7A | 8A | 9A | 10A | 11A | 12N | 1P | 2P | 3P | 4P | 5P | 6P | 7P |
|---|---|---|---|---|---|---|---|---|---|---|---|---|---|---|---|---|---|---|---|
| | | | | | | | | | | | | | | | | | | | 215 |

METHOD AND SYSTEM FOR CONTROLLING A SCHEDULING ORDER PER CATEGORY IN A MUSIC SCHEDULING SYSTEM

CROSS-REFERENCE TO RELATED APPLICATIONS

The present U.S. Utility Patent Application claims priority pursuant to 35 U.S.C. § 120 as a continuation of U.S. Utility application Ser. No. 13/850,912, entitled "METHOD AND SYSTEM FOR CONTROLLING A SCHEDULING ORDER PER CATEGORY IN A MUSIC SCHEDULING SYSTEM", filed Mar. 26, 2013, which is a continuation of U.S. Utility application Ser. No. 12/856,952, entitled "METHOD AND SYSTEM FOR CONTROLLING A SCHEDULING ORDER PER CATEGORY IN A MUSIC SCHEDULING SYSTEM," filed Aug. 16, 2010, all of which are hereby incorporated herein by reference in their entirety and made part of the present U.S. Utility Patent Application for all purposes.

TECHNICAL FIELD

Embodiments are generally related to the scheduling of the delivery and airplay of multimedia content. Embodiments are additionally related to airplay of audio, including music, over radio stations and networks of radio stations. Embodiments further relate to a reverse multimedia scheduling technique.

BACKGROUND OF THE INVENTION

Most radio stations employ a music director to select and schedule music and other multimedia programming for airplay. A typical music director is responsible for interacting with record company reps, auditioning new music, and making decisions (sometimes in conjunction with a program director) as to which songs get airplay, how much and when. At most radio stations today, the music director devises rotations for songs and programs of the daily music through specialized music software made just for this purpose.

A typical FM radio station, for example, may air a national show weekdays in a 4 pm to 5 pm slot. The content for such a show may be scheduled out of another FM radio station, typically located geographically distant from other associated radio stations. The show's content is sent to the other stations within a radio station network for hand-placement in a local GSelector database of music, audio and other multimedia content.

Music directors often have difficulty in evenly programming local rotations to prevent clashes with network programs. If the music director fails to account for the content of network programming that runs next to local programming, the listener could be exposed to repeated programming. Music directors often hand-place songs to try and prevent theses clashes between network and local programming. It is difficult, however, for a music director to adjust local program content in a way that will prevent programming clashes with the network programming later in the day yet still maintain good rotation of the local content. The music director would probably not recognize programming clashes between the local and network show in the hours long before the network show. Only as the music director approaches the network hours would the director see the programming clashes. Having to re-program much of the day's content to correct the clashing rotations is inefficient.

A possible solution to this programming clash is hand-placing content backwards in the local show, starting from the time slot of the local programming that is closest to the network programming. Once the songs for the network show have been placed into the schedule, the music director for each station could then work backwards from the beginning of that show, hand placing the local songs in high-turnover categories. These categories typically have, for example, between three and nine songs. If the music director begins song placement in the hour time slot immediately preceding the network show, the director can take into account the actual music content of the network show to maintain even rotations in the local show. Therefore, a need exists to provide an efficient system and method for controlling a reverse scheduling order per category in a multimedia scheduling system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The following discussion is intended to provide a brief, general description of suitable computing environments in which the system and method may be implemented. Although not required, the disclosed embodiments are generally described in the general context of computer-executable instructions, such as, for example, one or more program modules, which can be executed by a processor, computer, or a group of interconnected computers.

Figure 1:
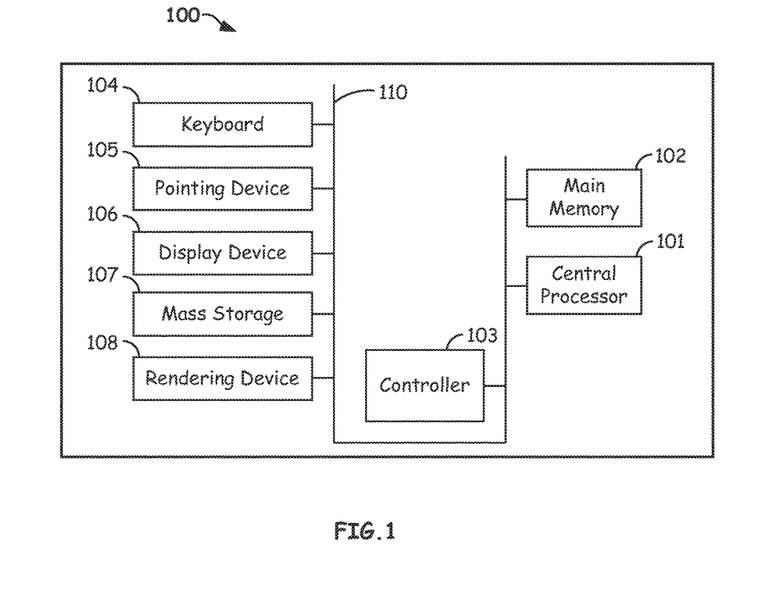
FIG. 1 illustrates a schematic view of a data-processing system, in accordance with the disclosed embodiments.
Figure 2:
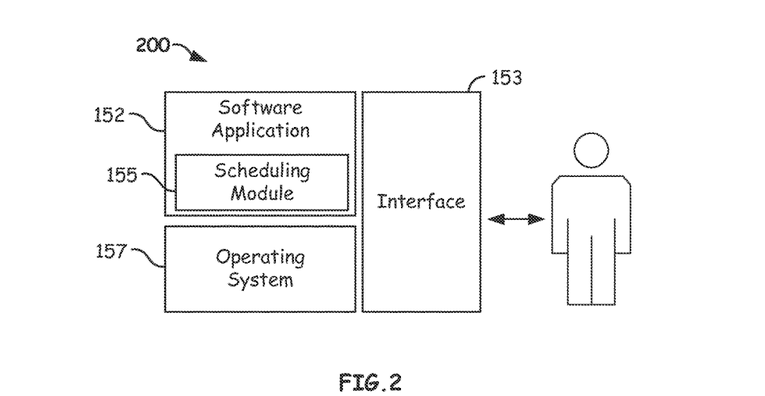
FIG. 2 illustrates a schematic view of a software system including an operating system, application software, and a user interface, in accordance with the disclosed embodiments.

FIGS. 1-2 are provided as exemplary diagrams of a data processing environment in which embodiments may be implemented. It should be appreciated that FIGS. 1-2 are only exemplary and are not intended to assert or imply any limitation with regard to the environments in which aspects or embodiments of the invention may be implemented. Many modifications to the depicted environments may be made without departing from the spirit and scope of the present invention.

As illustrated in FIG. 1, the disclosed embodiments may be implemented in the context of a data-processing system 100, which can be configured to include, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output components, such as a hardware interface 108, for example, may be electronically connected to the data-processing system 100 as desired. Note that such hardware interface 108 may constitute, for example, a USB (Universal Serial Bus) that allows other devices, such as printers, fax machines, scanners, copiers, and so on, to be communicated with the data-processing system 100.

Note that as illustrated, the various components of the data-processing system 100 communicate through a system bus 110 or similar architecture. It can be appreciated that the data-processing system 100 may in some embodiments, be implemented as a mobile computing device such as a Smartphone, laptop computer, Apple®, iPhone®, etc. In other embodiments, data-processing system 100 may function as a desktop computer, server, and the like, depending upon design considerations.

FIG. 2 illustrates a computer software system 200 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system 151 and/or interface 153.

Note that the term module as utilized herein may refer to a collection of routines and data structures that perform a particular task or implement a particular abstract data type. Modules may be composed of two parts: an interface, which lists the constants, data types, variable, and routines that can be accessed by other modules or routines, and an implementation, which is typically private (accessible only to that module) and which includes a source code that actually implements the routines in the module. The term module may also simply refer to an application, such as a computer program design to assist in the performance of a specific task, such as word processing, accounting, inventory management, music program scheduling, etc.

Generally, program modules include routines, programs, objects, components, data structures, etc., that perform particular tasks or implement particular abstract data types. Moreover, those skilled in the art will appreciate that the disclosed method and system may be practiced with other computer system configurations, such as, for example, handheld devices, multi-processor systems, microprocessor-based or programmable consumer electronics, networked PCs, minicomputers, mainframe computers, and the like.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are potential. For example, rather than a traditional "Windows" system, other operation systems, such as, for example, Linux may also be employed with respect to operating system 151 and interface 153. The software application 152 can include a scheduling module 155 that can be adapted to control scheduling with respect to the delivery and airplay of multimedia content, as described in greater detail herein. The software application 152 can also be configured to communicate with the interface 153 and various components and other modules and features as described herein. The module 155, in particular, can implement instructions for carrying out, for example, the method 300 depicted in FIG. 3 and/or additional operations as described herein.

Figure 3:
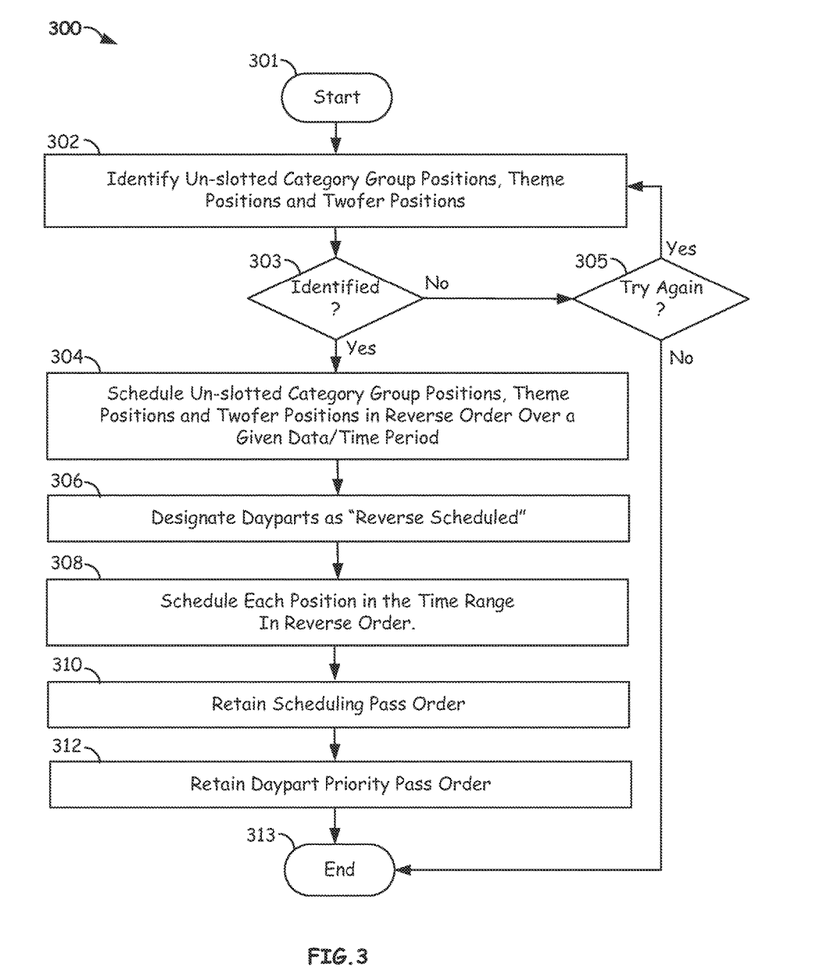
FIG. 3 illustrates a flow chart of operations depicting logical operational steps of a method for controlling a scheduling order per category, in accordance with the disclosed embodiments.

FIG. 3 illustrates a flow chart of operations depicting logical operational steps of a method 300 for controlling a scheduling order per category, in accordance with the disclosed embodiments. The method 300 offers the ability to control a scheduling order and set such a scheduling order either as a forward order per category or a reverse order per category.

As illustrated at block 301, the process for controlling a scheduling order per category can be initiated. Next, as illustrated at block 302, an operation can be processed to identify un-slotted category group positions, theme positions and twofer positions. Thereafter, a test can be performed, as illustrated at block 303, to determine if the un-slotted category group positions, theme positions, and twofer positions have all been identified. If, however, such un-slotted category group positions, theme position, and twofer positions have not been identified in block 302, then an additional test can be performed, as indicated at block 305, to determine whether or not to attempt to identify such data again. If it is determined to make another attempt at identifying such data, then the operation described at block 302 can be processed again, and so on. If, however, as indicated at block 305, it is determined not to make another attempt at identifying such data, then the process terminates, as depicted at block 313.

Assuming that such data has been identified, then un-slotted category group positions, theme positions and twofer positions can be scheduled in reverse order over a given date/time period, as illustrated in block 304 Next, as illustrated at block 306, dayparts can be designated as "Reverse Scheduled". When scheduling category groups, themes or twofers designated as "Reverse Scheduled" in dayparts, designated as "Reverse Scheduled," each position in the time range can be scheduled in reverse order, as illustrated in block 308. Next, as illustrated at block 310, a scheduling pass order is retained, followed by retaining the daypart priority pass order, as illustrated in block 312. The process then terminates as illustrated in block 313.

As indicated above, the method 300 for controlling a scheduling order per category can be implemented in the context of a module or group of modules. Such modules include computer implementable instructions for performing instructions including the individual operational steps indicated in the various blocks depicted in FIG. 3. Note that various software applications and implementations may be configured to provide one or more of the instructions illustrated in FIG. 3. One possibility involves configuring a database and associated modules to designate such scheduling control. For example, a bit field may be added to a "StationDayparts" table to designate if a daypart can be reverse scheduled as follows:

```
ALTER TABLE dbo.StationDayparts ADD
    reverseSchedule bit NOT NULL CONSTRAINT
    DF_StationDayparts_reverseSchedule
    DEFAULT 0
```

Additionally, a new "Pass Order" table, which can store pass order information regarding Category Groups, Link Categories, Themes and Twofers, can be configured as follows:

```
CREATE TABLE [dbo].[StationPassOrder] (
    [stationID] [int] NOT NULL,
    [entryTypeID] [int] NOT NULL,
    [groupID] [int] NOT NULL,
    [passOrder] [int] NOT NULL,
    [reverseSchedule] [bit] NOT NULL CONSTRAINT
[DF_StationPassOrder_reverseSchedule] DEFAULT ((0)),
CONSTRAINT [PK StationPassOrder] PRIMARY KEY CLUSTERED
(
    [stationID] ASC,
    [entryTypeID] ASC,
    [val] ASC
) WITH (PAD_INDEX = OFF, STATISTICS_NORECOMPUTE = OFF,
IGNORE_DUP_KEY = OFF, ALLOW_ROW_LOCKS = ON,
ALLOW_PAGE_LOCKS = ON) ON [PRIMARY]
) ON [PRIMARY]
```

Additionally, upgrade script can be created in order to copy pass order settings from the StationCategoryGroups table for each Category Group to a StationPassOrder table. The groupID can be to the category group id. Upgrade script can also be created in order to copy the pass order settings from the Stations table for Theme and Twofer to the StationPassOrder table. The groupID can be set to 0. The pass order columns can also be deleted for Theme and Twofer from the Stations table as follows:

```
ALTER TABLE [dbo].[Stations] DROP CONSTRAINT
[DF_stations_twoferPassOrder]
go
ALTER TABLE [dbo].[Stations] DROP COLUMN [twoferPassOrder]
go
ALTER TABLE [dbo].[Stations] DROP CONSTRAINT
[DF_stations_themePassOrder]
go
ALTER TABLE [dbo].[Stations] DROP COLUMN [themePassOrder]
go
```

Delete the passOrder Column from the StationCategoryGroups Table

```
ALTER TABLE dbo.StationCategoryGroups
    DROP CONSTRAINT DF_StationCategoryGroups_passOrder
GO
ALTER TABLE dbo.StationCategoryGroups
    DROP COLUMN passOrder
```

A variety of service designs can be configured in the context of constructing a method and/or system for scheduling per category. For example, a "Pass Order" may be implemented, which provides Read and/or Write techniques with respect to the "StationPassOrder" table discussed earlier. Additionally, such a "Pass Order" allows for inserting, deleting and updating entries, inserting/deleting entries for category groups as they are added/deleted in a particular radio station, and also for inserting/deleting an entry with respect to a twofer when twofers are enabled/disabled. In such a design a reverseSchedule property can be added to the categoryGroup class in schedulerData.cs and populated as category groups are added in the context of a GetcategoryGroups2 method. Additionally, new properties can be populated in the context of a SchedulerContext with the Twofer and Theme scheduling order.

Dayparts can also be configured, which expose the reverseSchedule property from the stationdayparts table in all queries. Such "dayparts" or "DayParts" can also save the reverseSchedule property when updating the stationdayparts table. A reverseSchedule property can be added to a Daypart class in SchedulerData.cs and populate dayparts are added in the context of a GetDaypartData2 method.

Other reverse scheduling aspects may be configured, including the handling of revised properties of stations and stationdayparts table, along with the handling of a new stationpassorder table. Copy and delete station capabilities can also be configured, including the handling of revised properties of stations and stationdayparts tables, along with the handling of new "stationpassorder" tables. Additionally, a "scheduler" can be implemented, including "Next Due" aspects and an "In ScheduleDayinParallel" method.

When both daypart and category groups are 'reverse schedule' designated, a call command calcNextDaypartPlay can be implemented instead of calcPriorDaypartPlay. Additionally, local variables can be swapped prior to calling calcDueness as follows Int32 firstSongPosinDaypart and Int32 lastSongPosinDaypart. Additionally, the 'next play' can be passed to calcDueness instead of 'last play'. The operation calcDueness can also be modified to use the absolute difference between the 'current play' and the 'last play'. Regarding the "Hour" and timing, when the both daypart and category group are in a 'reverse schedule' mode, a new method (or module) may be written called calcNextHourPlay. Other operations include calling calcNextHourPlay instead of calcPriorHourPlay and swapping the local variables prior to calling calcDuenessinHour as follows: Int32 lastSongPosinHour and Int32 firstSongPosinHour. Additional modifications include 'pass' the 'next play' to calcDuenessinHour instead of 'last play' and modifying calcDuenessinHour to use the absolute difference between the 'current play' and the 'last play'.

Category group positions can be provided by creating a new class OrderedDaypartSegment, derived from DaypartSegment, which has an additional property to identify Forwards or Reverse scheduling and a list of category group ids to be scheduled as follows.

```
class OrderedDaypartSegment : DaypartSegment
{
            enum SchedulingOrder {Forward, Backward}
            List<int> categoryGroupsinSegment
}
    ■       In LinearPass method
```

A calculation of "dueness" as above can occur, which takes into account forward or reverse scheduling to ensure search depth uses correct songs. Additionally, a new list of OrderedDaypartSegments called newDaypartSegsinTimeOrder can be populated and constructed from the DaypartSegments in daypartSegsinTimeOrder and each segment designated as Forwards. For the daypart in each segment in the range, if the daypart is not 'Reverse Schedule' then all the specified category group ids from the catgroupsinpass can be added to the seg.categoryGroupsInSegment. If the daypart is 'Reverse Schedule', then only the category group ids from catgroupsinpass which are not 'Reverse Schedule' are added to the seg.categoryGroupsInSegment.

Additional OrderedDaypartSegments from the same DaypartSegment can be added in daypartSegsinTimeOrder in reverse order if any of the Category Groups are designated as 'Reverse Schedule' and the underlying daypart for the segment is also designated as 'Reverse Schedule'. These can be marked as Reverse, and the category group id added to the seg.categoryGroupsInSegment. Additional operations including iterating the new list of OrderedDaypartSegment, and instead of the foreach (DaypartSegment seg in daypartSegsinTimeOrder) the following is used: foreach (OrderedDaypartSegment seg in newDaypartSegsinTimeOrder).

Additional instructions including ensuring that songsByStackingTypeAndCatGroup is only populated once per category group and {hour|daypart} by only populating in the Forwards scheduling pass. Also, operations can be implemented to determine a start position, an end position and an increment based on seg.schedOffset, seg.numPositions, seg schedulingOrder and then iterating over each position in the segment in the desired order instead of always doing so from the beginning to end.

If the orderedDaypartsegment scheduling order is Forwards, then an operation can be processed to iterate over the schedule positions from beginning to end and continue to unschedule the planned songs as before. If the orderedDaypartsegment scheduling order is "Reverse," then an operation is implemented to iterate over the schedule positions from the end to the beginning, with no unscheduled planned songs.

When identifying if the position to schedule 1s in the correct category group for the current pass, instead of:

```
            if (se.entrytype == EntryType.Song
                && se.status == Status.Unscheduled
                && catgroupsinpass.Contains(se.catgrpid))
```

An operation can be implemented to ensure that the category group is valid for the current orderedDaypartsegment by evaluating the seg.categoryGroupsInSegment instead of catgroupsinpass. Regarding Artist Block Positions, the 'Reverse Scheduled' setting can be obtained for Twofers from SchedulerContext. Additionally, a "lookupScheduledArtistBlocks" method can be modified to yield a list of artist block positions based on the reverse schedule setting of unscheduled artist blocks and each daypart in the time range.

Regarding "Twofer Positions," an operation can be processed to obtain the 'Reverse Scheduled' setting for Twofers from SchedulerContext. The "lookupScheduledTwofers" method can be modified to yield a list of twofer positions based on the reverse schedule setting of unscheduled twofers and each daypart in the time range.

Regarding "Theme Positions," an operation can be processed to obtain the 'Reverse Scheduled' setting for Theme from SchedulerContext. A new list of OrderedDaypartSegments can be populated, which is called newDaypartSegsinTimeOrder and constructed from the DaypartSegments in daypartSegsinTimeOrder. The "schedulingOrder" can be then designated as Forwards or Reverse where applicable. Additional operations include iterating over the newDaypartSegsinTimeOrder. If the OrderedDaypartSegment scheduling order is Forwards, then iteration may take place over the schedule positions from beginning to end. If the OrderedDaypartSegment scheduling order is Reverse, then iteration can take place over the schedule positions from the end to the beginning.

In configuring a method and/or system for controlling a scheduling order, as discussed herein, policy information and conditions may be configured. For example, an operation may be implemented to update Policy Schema to handle revised properties of stations and a "stationdayparts" table and a new "stationpassorder" table. New and/or charged data can be propagated in "policy" XML and the "Pass Order" discussed herein can have a dependency on category groups.

Other potential design aspects including modifying the Pass Order by exposing the 'Reverse Schedule' property in a pass order dialog, along with pulling the pass order data when opening the pass order dialog, and merging with the pass order information for the category groups, theme and twofer rows. Additional design aspects include preventing slotted categories from being 'reverse scheduled' and persisting new pass order data when category data is saved. Regarding "dayparts," the "Reverse Scheduling" property can be exposed when adding, viewing and/or editing a daypart. Further design aspects including allowing for editing of the 'Reverse Scheduling' property in an Add/Edit daypart dialog only.

Note that as utilized herein the term "dialog" refers to a "dialog box," which is a special feature or window utilized in the context of a GUI (Graphical User Interface), such as, for example, the interface 153 of FIG. 2, to display information to a user, or to obtain a response, if required. A "dialog" refers to a dialog between a data-processing system, such as that described herein with respect to FIGS. 1-2 and the user. The data-processing system informs the user of something, requests input from the user, or both. Such a dialog or dialog box provides controls that allow a user to specify how to carry out a particular action.

Figure 4:
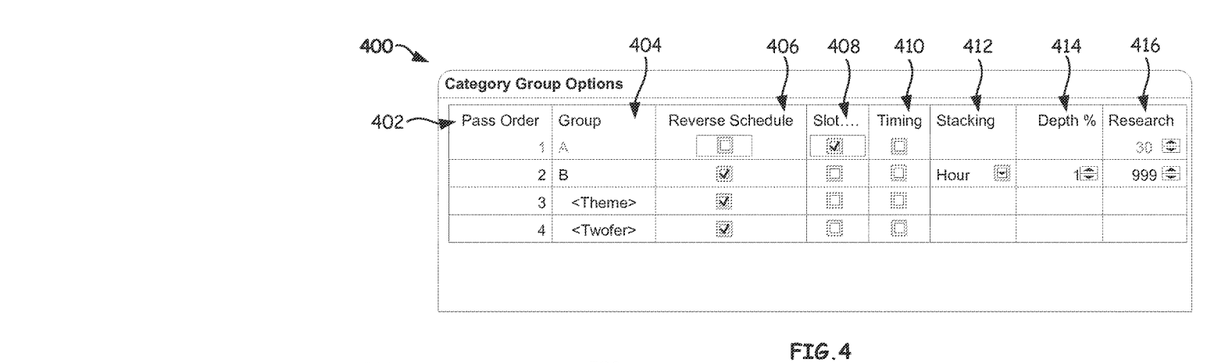
FIG. 4 illustrates an example of a graphically displayed table which may be utilized to configure settings for controlling a multimedia schedule, in accordance with the disclosed embodiments.

FIG. 4 illustrates an example of a graphically displayed table 400, which may be utilized to configure settings for controlling a multimedia schedule, in accordance with the disclosed embodiments. It can be appreciated that the table 400 can be displayed in the context of a GUI, such as the interface 153 of FIG. 2 for display on a display such as, for example, the display device 106 of FIG. 1. Category group options can be set using table 400. A user can interact with the table 400 to designate, for example, the "Pass Order" with respect to column 402 shown in FIG. 4. Column 404 allows a user to set "Group" options such as designating an "A" or "B" group or a <Theme> or <Twofer>. Column 406 allows a user to set "Reverse Schedule" options, while a particular slot may be set using controls within column 408. Additionally, timing options can be set using controls under column 410, and stacking options set using controls under column 412. Depth (percentage) can be set using controls associated with column 414. Finally, research data can be designated using data entered underneath column 416.

Figure 5:
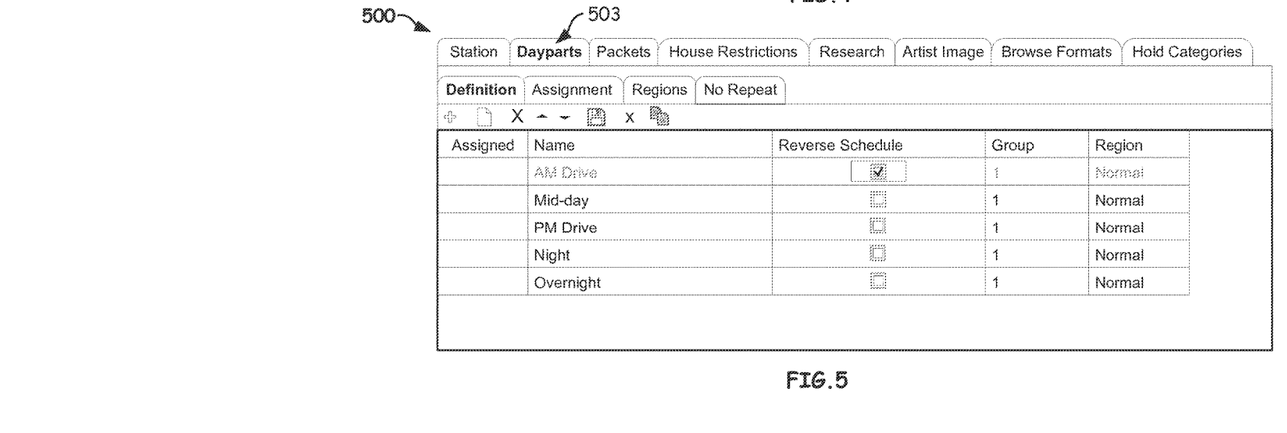
FIG. 5 illustrates an example of a graphically displayed table which may be utilized to configure settings for controlling a multimedia schedule, in accordance with the disclosed embodiments.

FIG. 5 illustrates an example of a graphically displayed table 500, which may be utilized to configure settings for controlling a multimedia schedule, in accordance with the disclosed embodiments. Table 500, in association with table 400, provide a number of options. The most notable option for selection in FIG. 5 is the ability to designate "Dayparts" data and settings, as indicated by the controls associated with the graphically displayed tab 503.

In an embodiment of the disclosed invention, an efficient multimedia scheduling technique intends to optimize the rotation of smaller categories containing multimedia that also appear in pre-scheduled special programming. In a pre-programmed countdown show that airs at 7:00 p.m., for example, songs may be featured that also play in a normally scheduled category. Typically, songs featured in a countdown show are pre-scheduled before the scheduler, or scheduling module of a computer-implemented device, schedules the programming for the preceding time slots. This can lead to compromised rotations of those songs as the scheduler attempts to work around the rotation problem.

Figure 6A:
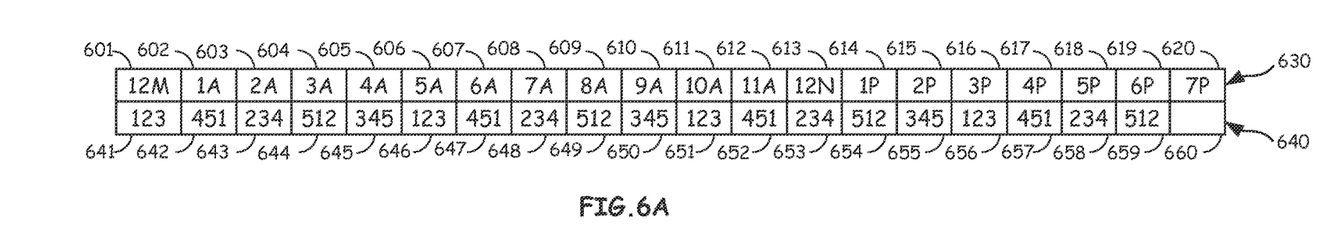
FIG. 6A illustrates an example of a multimedia programming rotation with evenly-spaced multimedia plays throughout a programming day, in accordance with the disclosed embodiments.

FIG. 6a illustrates an example of a multimedia programming rotation with evenly-spaced plays throughout a programming day. Each column illustrates the programming rotation of three songs out of a rotation of five songs (each song numbered 1 through 5) per hour-long time slot, beginning with 12:00 midnight 601 and ending with 7:00 p.m. 620. The top row 630 shows the day's particular time slot, beginning with 12:00 midnight and ending with 7:00 p.m. and the bottom row 640 shows the three particular songs out of five total songs in a category chosen for that particular time slot. FIG. 6a illustrates how five songs in a single category would be equally rotated with three clock requests each hour for that category. In the 12:00 midnight time slot 601, for example, songs 1-2-3 are scheduled 641 to air. In the next time slot 602, songs 4-5-1 are scheduled 642 to air. The song pattern of 1-2-3-4-5 repeats until the scheduling pattern ceases following the 6:00 p.m. hour 619, or just before for the pre-programmed show at 7:00 p.m. 620. As an ideal rotation, the five songs in a single category are equally spread and get even play in the program throughout the day, beginning at 12:00 midnight 601 and ending at 6:00 p.m. 619, before the start of the 7:00 pm. countdown show.

Figure 6B:
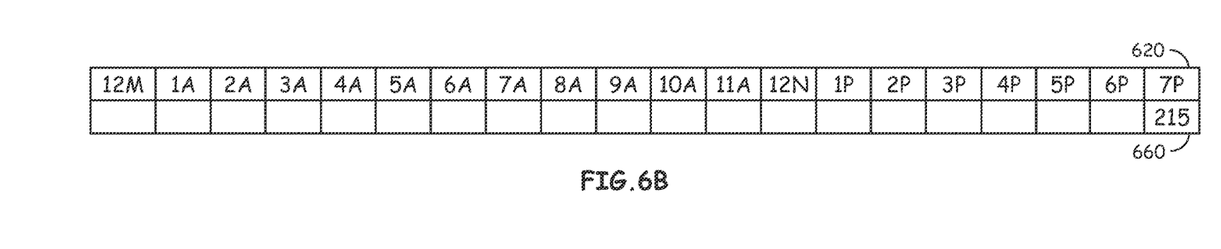
FIG. 6B illustrates an example of a graphically displayed table showing the three songs scheduled to be played in a pre-programmed countdown show, in accordance with the disclosed embodiments.

This ideal rotation, however, can be interrupted depending on the songs scheduled to air during the pre-programmed countdown show. FIG. 6b illustrates the three songs scheduled 660 to be played in the 7:00 time slot 620 during a pre-programmed countdown show. Songs 2-1-5 are pre-programmed 660 in this order into the schedule during the 7:00 p.m. time slot 620.

Figure 6C:
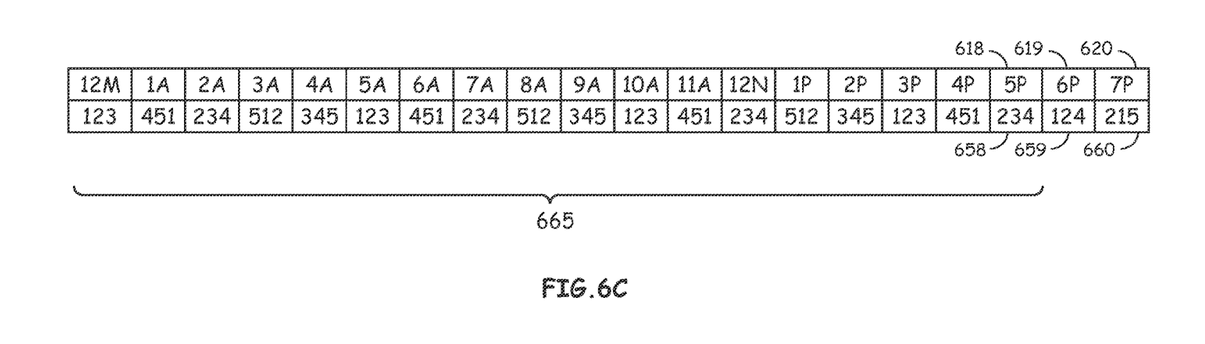
FIG. 6C illustrates an example of a graphically displayed table used for scheduling the remaining time slots throughout the day, in accordance with the disclosed embodiments.

In FIG. 6c, with the countdown show songs (2-1-5) in the 7:00 p.m. time slot 612, the remaining time slots throughout the day are scheduled 665. The five songs, however, are not evenly-spread throughout the day's programming when manual scheduling begins at the beginning of the day at the 12:00 midnight time slot 601 when the 7:00 p.m. time slot 660 is already pre-programmed. In the 6:00 p.m. time slot 619, songs 2-1-5 would be ideal choices based on the previous time slot's schedule, as illustrated in 659 in FIG. 6a. But, songs 2-1-5 have already been scheduled 660 for the 7:00 p.m. countdown show. The scheduler has to make serious compromises to the rotational pattern, thus having to settle with songs 1-2-4 669 in the 6:00 p.m. time slot 619. Scheduling songs 1-2-4 669 in the 6:00 p.m. time slot 619 results in songs 2 and 4 having poor spread due to their play in the previous 5:00 p.m. time slot 618. There are very few ways to resolve the scheduling problem when the countdown show is pre-programmed and the rest of the day's programming is set starting at the beginning of the day.

Figure 6D:
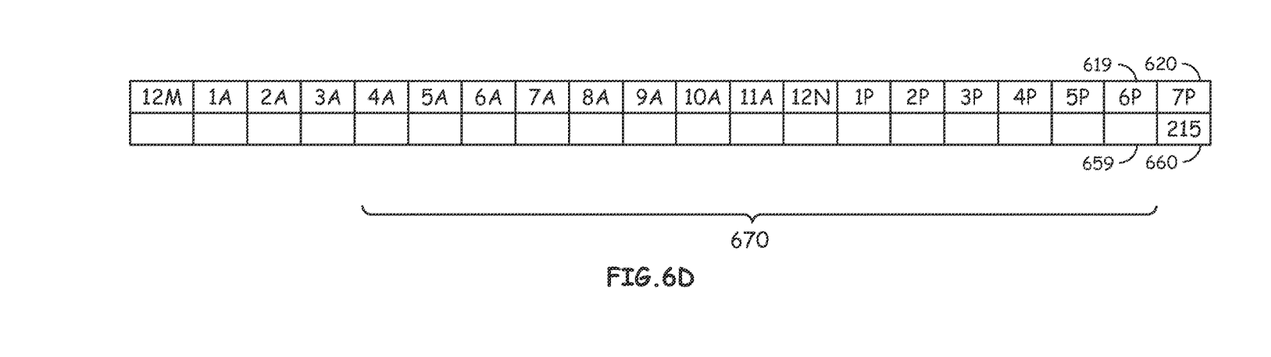
FIG. 6D illustrates an example of a graphically displayed table used for in which a reverse scheduling method is used to solve scheduling problems, in accordance with the disclosed embodiments.
Figure 6E:
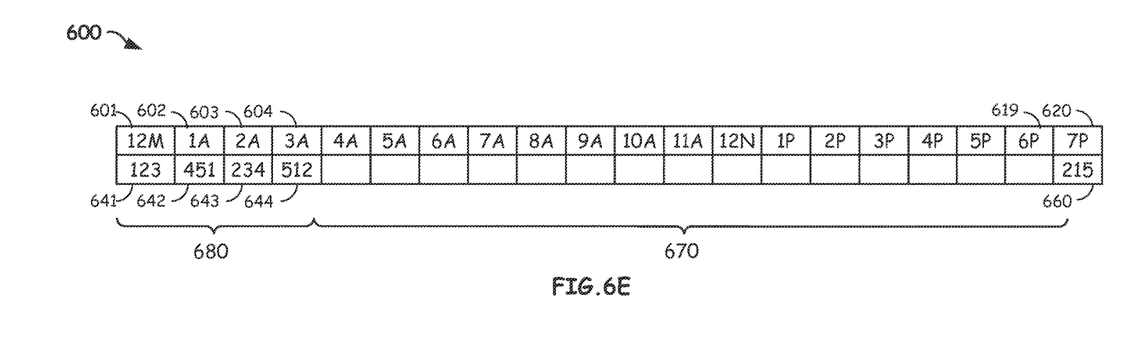
FIG. 6E illustrates an example of a graphically displayed table used for scheduling a time slot range in regular chronological order, in accordance with the disclosed embodiments.

FIG. 6d illustrates a time slot range 670 in which a reverse scheduling method 600 is used to solve scheduling problems as described in FIGS. 6a-6c. Reverse scheduling, as illustrated in FIG. 6d works by scheduling a day's programming from the reverse direction, starting immediately before the pre-programmed show. The scheduler provides a time slot range 670 in which day's programming is to be scheduled in reverse chronological order, preventing rotation problems with pre-scheduled programming. For example, in FIG. 6e, the countdown show is again scheduled at 7:00 p.m. 620, with songs 2-1-5 pre-programmed 660. The time slot range 680 from 12:00 midnight 601 to 3:00 a.m. 604 is scheduled in regular chronological order, as shown in FIG. 6e, as this range is an off-peak time slot range.

Figure 6F:
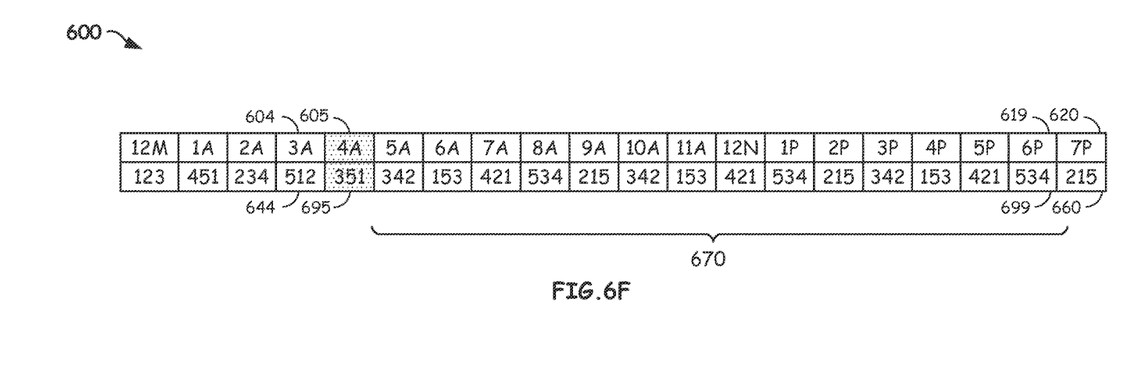
FIG. 6F illustrates an example of a graphically displayed table used for scheduling a time slot range in reverse chronological order, in accordance with the disclosed embodiments.

In FIG. 6f, the time slot range from 5:00 a.m. 605 to 6:00 p.m. 619 is scheduled in reverse chronological order to prevent rotation problems between the countdown show in the 7:00 p.m. time slot and the time slots immediately preceding the show. The scheduler or a computer-implemented scheduling module starts at 6:00 p.m. 619 and looks both ahead in time and behind in time to make the best scheduling choices. When starting with the 6:00 p.m. hour 619, the scheduler finds that songs 2-1-5 660 are closest to the songs in the pre-scheduled countdown show in the 7:00 p.m. time slot 620. The scheduler then avoids scheduling this song combination of 2-1-5 in the 6:00 p.m. time slot. Because one song out of this three song combination must be used in the 6:00 p.m. time slot 619, the scheduler module chooses song 5 to schedule in the 6:00 p.m. time slot, in the farthest position from the rotation in the 7:00 p.m. time slot. Scheduling song 5 in the first position in the 6:00 p.m. time slot provides the most separation from the song 5's play in the pre-scheduled 7:00 p.m. time slot.

Looking back in time, the scheduler sees that songs 3 and 4 are played, in that order, in the 2:00 a.m. time slot. To keep songs 3 and 4 as separate as possible for a proper rotation, the scheduler places songs 3 and 4, in that order, in the remaining two positions in the 6:00 p.m. time slot. The final order of songs in the 6:00 p.m. time slot 619 is 5-3-4 699. The scheduler then works in reverse chronological order from the 6:00 p.m. time slot 619, essentially repeating the established pattern to schedule the remaining time slots and prevent scheduling problems with pre-programmed show at 7:00 p.m. 620.

The reverse scheduling method 600 disclosed herein allows a scheduler to prevent scheduling problems during peak rotation hours, by burying rotational compromises in off-peak hours. In FIG. 6f, for example, following performance of the reverse scheduling method 600, the established scheduling pattern must be broken in the 4:00 a.m. time slot 605 because of scheduling conflicts in the 3:00 a.m. time slot. Following the reverse chronological scheduling pattern, the 4 a.m. time slot 605 should be programmed with songs 2-1-5, in that order. In the 3:00 a.m. time slot 604, however, songs 5-1-2 are already scheduled 644 in that order. The scheduler must compromise the rotation schedule in the off-peak 4:00 a.m. time slot, and schedule songs 3-5-1 695 instead. However, there are fewer listeners in this hour as compared to the 6:00 p.m. time slot. By properly constructing a reverse scheduling region, the user can now "bury" the scheduling compromise at a time where any negative impact on the rotation will affect far fewer listeners than the number who would have been affected by poor rotation in the 6:00 p.m. time slot.

It will be appreciated that variations of the above-disclosed and other features and functions, or alternatives thereof, can be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for use in a media scheduling system, the method comprising:
storing, at the media scheduling system, at least a first database table including category group options for a plurality of category groups, wherein a particular category group includes a plurality of media items related to a common category, the category group options including:
reverse schedule information indicating whether unslotted category group positions of a particular category group are to be scheduled in a reverse category order or a forward category order, wherein the reverse category order indicates that the unslotted category group positions are to be scheduled from later in time to earlier in time, and the forward category order indicates that unslotted category group positions are to be scheduled from earlier in time to later in time; and
pass order information indicating a pass order in which the plurality of category groups are to be scheduled;
copying pass order information for the plurality of category groups from the first database table to a second database table associated with a particular media station;
identifying the unslotted category group positions in a media schedule associated with the particular media station, the media schedule used by the particular media station to control a media broadcast, by executing a program instruction in the media scheduling system; and
processing the second database table to generate a broadcast schedule by placing media items from the plurality of category groups in the unslotted category group positions in the media schedule, the unslotted category group positions filled in a pass order indicated by the pass order information, and in either a forward order or a reverse order as indicated by the reverse schedule information, by executing a program instruction in the media scheduling system.

2. The method of claim 1, further comprising:
selecting a particular daypart of a plurality of dayparts to schedule, wherein the particular daypart includes first and second unslotted category group positions of first and second category groups, by executing a program instruction in the media scheduling system;
scheduling the first unslotted category group positions associated with the first category group in a reverse category order, by executing a program instruction in the media scheduling system; and
scheduling the second category group positions associated with the second category group in a forward category order, by executing a program instruction in the media scheduling system.

3. The method of claim 1, further comprising:
storing, at the media scheduling system, daypart data settings indicating whether a particular daypart is to be scheduled in a reverse daypart order or a forward daypart order, wherein the reverse daypart order indicates that sub-units of time within the particular daypart are to be scheduled from later in time to earlier in time, and the forward daypart order indicates that sub-units of time within the particular daypart are to be scheduled from earlier in time to later in time; and
scheduling the sub-units of time within the particular daypart in one of a forward daypart order or a reverse daypart order as indicated by the daypart data settings, by executing a program instruction in the media scheduling system.

4. The method of claim 3, further comprising:
determining, using the category group options and the daypart data settings, that the unslotted category group positions of the particular category group are to be scheduled in the reverse category order, and that the particular daypart is to be scheduled in the reverse daypart order, by executing a program instruction in the media scheduling system; and
in response to the determining, scheduling a latest-in-time unslotted category group position included in a latest-in-time sub-unit of the particular daypart before scheduling an earlier-in time unslotted category group position included in the latest-in-time sub-unit, by executing a program instruction in the media scheduling system.

5. The method of claim 3, further comprising:
scheduling at least one unslotted category group position using the reverse category order during a scheduling operation using the forward daypart order, by executing a program instruction in the media scheduling system.

6. The method of claim 3, further comprising:
scheduling at least one unslotted category group position using the forward category order during a scheduling operation using the reverse daypart order, by executing a program instruction in the media scheduling system.

7. The method of claim 1, wherein the at least a first table further includes:
information indicating whether a Twofer position is to be reverse scheduled.

8. A media scheduling system comprising:
a processor;
a memory coupled to the processor; and
a program of instructions stored in the memory and configured to be executed by the processor, the program of instructions including:
at least one instruction to store at least a first database table including category group options for a plurality of category groups, wherein a particular category group includes a plurality of media items related to a common category, the category group options including:
reverse schedule information indicating whether unslotted category group positions of a particular category group are to be scheduled in a reverse category order or a forward category order, wherein the reverse category order indicates that the unslotted category group positions are to be scheduled from later in time to earlier in time, and the forward category order indicates that unslotted category group positions are to be scheduled from earlier in time to later in time; and
pass order information indicating a pass order in which the plurality of category groups are to be scheduled;

at least one instruction to copy pass order information for the plurality of category groups from the first database table to a second database table associated with a particular media station;
at least one instruction to identify the unslotted category group positions in a media schedule associated with the particular media station; and
at least one instruction to process the second database table to generate a broadcast schedule by placing media items from the plurality of category groups for placement in the unslotted category group positions in the media schedule, the unslotted category group positions filled in a pass order indicated by the pass order information, and in either a forward order or a reverse order as indicated by the reverse schedule information.

9. The media scheduling system of claim 8, further comprising:
at least one instruction to select a particular daypart of a plurality of dayparts to schedule, wherein the particular daypart includes first and second unslotted category group positions of first and second category groups;
at least one instruction to schedule the first unslotted category group positions of the first category group in a reverse category order; and
at least one instruction to schedule the second unslotted category group positions of the second category group in a forward category order.

10. The media scheduling system of claim 8, further comprising:
at least one instruction to store daypart data settings indicating whether a particular daypart is to be scheduled in a reverse daypart order or a forward daypart order, wherein the reverse daypart order indicates that sub-units of time within the particular daypart are to be scheduled from later in time to earlier in time, and the forward daypart order indicates that sub-units of time within the particular daypart are to be scheduled from earlier in time to later in time; and
at least one instruction to schedule the sub-units of time within the particular daypart in one of a forward daypart order or a reverse daypart order as indicated by the daypart data settings.

11. The media scheduling system of claim 10, further comprising:
at least one instruction to make a determination, using the category group options and the daypart data settings, that the unslotted category group positions of the particular category group are to be scheduled in the reverse category order, and that the particular daypart is to be scheduled in the reverse daypart order; and
at least one instruction to schedule, in response to the determination, a latest-in-time unslotted category group position included in a latest-in-time sub-unit of the particular daypart before scheduling an earlier-in time unslotted category group position included in the latest-in-time sub-unit.

12. The media scheduling system of claim 10, further comprising:
at least one instruction to schedule at least one unslotted category group position using the reverse category order during a scheduling operation using the forward daypart order.

13. The media scheduling system of claim 10, further comprising:
at least one instruction to schedule at least one unslotted category group position using the forward category order during a scheduling operation using the reverse daypart order.

14. The media scheduling system of claim 8, wherein the at least a first table further includes:
information indicating whether a Theme position is to be reverse scheduled.

15. The media scheduling system of claim 8, wherein the at least a first table further includes:
information indicating an order in which the plurality of category groups are to be scheduled.

16. A non-transitory computer readable medium tangibly embodying a program of computer executable instructions, the program of computer executable instructions including:
at least one instruction to store, in a database table, category group options for a plurality of category groups, wherein a particular category group includes a plurality of media of a category, the category group options including:
reverse schedule information indicating whether unslotted category group positions of a particular category group are to be scheduled in a reverse category order or a forward category order;
at least one instruction to identify the unslotted category group positions in a media schedule associated with a particular media station; and
at least one instruction to process the database table to generate a broadcast schedule by placing media items from the plurality of category groups for placement in the unslotted category group positions in the media schedule, the unslotted category group positions filled using a forward order or a reverse order as indicated by the reverse schedule information.

17. The non-transitory computer readable medium of claim 16, further comprising:
at least one instruction to select one or more dayparts of a plurality of dayparts to schedule, wherein the one or more dayparts include first and second unslotted category group positions of first and second category groups;
at least one instruction to schedule the first unslotted category group positions of the first category group in a reverse category order; and
at least one instruction to schedule the second unslotted category group positions of the second category group in a forward category order.

18. The non-transitory computer readable medium of claim 16, further comprising:
at least one instruction to store daypart data settings indicating whether a particular daypart is to be scheduled in a reverse daypart order or a forward daypart order; and
at least one instruction to schedule the particular daypart in one of a forward daypart order or a reverse daypart order as indicated by the daypart data settings.

19. The non-transitory computer readable medium of claim 18, further comprising:
at least one instruction to make a determination, using the category group options and the daypart data settings, that the unslotted category group positions of the particular category group are to be scheduled in the reverse category order, and that the particular daypart is to be scheduled in the reverse daypart order; and
at least one instruction to schedule, in response to the determination, a latest-in-time unslotted category group position included in a latest-in-time sub-unit of the particular daypart before scheduling an earlier-in time unslotted category group position included in the latest-in-time sub-unit.

20. The non-transitory computer readable medium of claim 16, wherein the category group options include information indicating that the unslotted category group positions are to be scheduled in reverse order over a defined date and time period.

\* \* \* \* \*